(12) United States Patent
Sjösten et al.

(10) Patent No.: US 9,073,190 B2
(45) Date of Patent: Jul. 7, 2015

(54) DEVICE FOR PRESSING ON A DOUBLE CLUTCH

(75) Inventors: Thomas Sjösten, Donaueschingen (DE); Stefan Baur, Donaueschingen (DE)

(73) Assignee: Klann Spezial-Werkzeugbau GmbH, Donaueschingen (DE)

( * ) Notice: Subject to any disclaimer, the term of this patent is extended or adjusted under 35 U.S.C. 154(b) by 918 days.

(21) Appl. No.: 13/206,748

(22) Filed: Aug. 10, 2011

(65) Prior Publication Data

US 2012/0036689 A1 Feb. 16, 2012

(30) Foreign Application Priority Data

Aug. 10, 2010 (DE) ..................... 20 2010 011 341 U

(51) Int. Cl.

| | |
|---|---|
| ***B23P 19/04*** | (2006.01) |
| ***B25B 27/02*** | (2006.01) |
| ***B25B 27/00*** | (2006.01) |

(52) U.S. Cl.

CPC ......... *B25B 27/023* (2013.01); *Y10T 29/53848* (2015.01); *B25B 27/0064* (2013.01)

(58) Field of Classification Search

CPC ............ B25B 27/0035; B25B 27/0064; B25B 27/073; B25B 27/14; B25B 27/023; Y10T 29/53848

USPC ........... 29/263, 255, 270, 256, 274, 278, 265, 29/260, 261

IPC ........................................... B25B 27/073, 27/14

See application file for complete search history.

(56) References Cited

U.S. PATENT DOCUMENTS

| | | | | | |
|---|---|---|---|---|---|
| 1,123,513 | A * | 1/1915 | Gaillard | ........................... | 29/261 |
| 1,777,616 | A * | 10/1930 | Hommel | ......................... | 29/252 |
| 2,310,639 | A * | 2/1943 | Johnson, Jr. | .................... | 29/262 |
| 4,239,196 | A * | 12/1980 | Hanger | ........................... | 269/17 |
| 4,705,264 | A * | 11/1987 | Hawkins et al. | ................ | 269/17 |
| 4,716,642 | A * | 1/1988 | Bill et al. | ......................... | 29/265 |
| 4,908,925 | A * | 3/1990 | Johnson | .......................... | 29/260 |

(Continued)

FOREIGN PATENT DOCUMENTS

| | | | |
|---|---|---|---|
| DE | 4028841 | C1 * | 11/1991 |
| DE | 102005041193 | A1 | 3/2006 |

(Continued)

*Primary Examiner* — Joseph J Hail
*Assistant Examiner* — Marc Carlson
(74) *Attorney, Agent, or Firm* — McGlew and Tuttle, P.C.

(57) ABSTRACT

A device for pressing a double clutch (130) onto a transmission shaft arranged in a clutch housing (127) of a gearbox. The device is used for different embodiments of the clutch housing (127) of the double clutch transmission. The device includes a plurality of tie bolts (126, 126/1), stationarily connectable to the clutch housing (127), a pressing device (100), which is provided with an axially adjustable pressing rod (101) and can be brought into pressing connection with the double clutch (130) and a support device (1) connecting the tie bolts (126, 126/1) to the pressing rod. The support device (1) has a central mounting element (2, 3, 4), in which the pressing device (100) is mounted. The support device (1) has a plurality of support arms (5, 6, 7), which each mesh with one of the tie bolts (126, 126/1). The support arms (5, 6, 7) are mounted at the mounting element (2, 3, 4) about a pivot axis in parallel to the pressing rod (101) for the alignment of the pressing device (100) with the transmission shaft.

19 Claims, 5 Drawing Sheets

(56) References Cited

U.S. PATENT DOCUMENTS

| | | | | | |
|---|---|---|---|---|---|
| 6,089,545 | A * | 7/2000 | Norman et al. | ............... | 254/134 |
| 6,105,946 | A * | 8/2000 | Sanders et al. | .................. | 269/17 |
| 6,257,552 | B1 * | 7/2001 | Crow et al. | ................... | 254/2 B |
| 6,457,700 | B1 * | 10/2002 | Hong | ............................ | 254/8 B |
| 6,491,293 | B1 * | 12/2002 | Brewer | ........................... | 269/17 |
| 6,581,920 | B1 * | 6/2003 | Smith et al. | ..................... | 269/17 |
| 7,117,573 | B1 * | 10/2006 | Hu | .................................. | 29/261 |
| 7,653,975 | B2 * | 2/2010 | Hu | .................................. | 29/259 |
| 7,685,688 | B2 * | 3/2010 | Fan | ................................. | 29/259 |
| 7,770,277 | B2 * | 8/2010 | Wridt | .............................. | 29/261 |
| 8,079,123 | B2 * | 12/2011 | Lin | ................................. | 29/259 |
| 8,347,474 | B2 * | 1/2013 | Oachs et al. | .................... | 29/259 |
| 2006/0053611 | A1 * | 3/2006 | Klann | .......................... | 29/281.5 |

FOREIGN PATENT DOCUMENTS

| | | | |
|---|---|---|---|
| DE | 102009039991 | A1 | 4/2010 |
| DE | 102009042071 | A1 | 4/2010 |
| DE | 102009048277 | A1 | 4/2010 |
| DE | 202010011341 | U1 | 10/2010 |
| DE | 202010011709 | U1 * | 11/2010 |

* cited by examiner

DEVICE FOR PRESSING ON A DOUBLE CLUTCH

CROSS REFERENCE TO RELATED APPLICATIONS

This application claims the benefit of priority under 35 U.S.C. §119 of German Utility Model DE 20 2010 011 341 filed Aug. 10, 2011, the entire contents of which are incorporated herein by reference.

FIELD OF THE INVENTION

The present invention pertains to a device for pressing a double clutch onto a transmission shaft of a double clutch transmission, which transmission shaft is arranged in a clutch housing of a gearbox.

BACKGROUND OF THE INVENTION

So-called double clutches have been known for a rather long time. They are characterized in that the torque delivered by a motor vehicle engine can be optionally transmitted to one of two transmission input shafts of a double clutch transmission. Contrary to single clutches, such double clutches form a compact unit which are not flanged to the flywheel or to the disk flywheel of the motor vehicle engine but in the area of the two transmission shafts. A transmission and especially a double clutch transmission is known to be connected to the motor vehicle engine via a housing-like clutch housing. The “clutch kit” or the double clutch becomes accessible after the transmission together with the clutch housing has been removed from the motor vehicle engine. The two transmission shafts of the double clutch transmission are arranged coaxially with one another, and one, “outer” transmission shaft is designed as a recess shaft, in which the other, “inner” transmission shaft is mounted. To make it possible to mechanically connect the two transmission shafts to a “carrier plate,” the inner transmission shaft is made axially longer than the outer transmission shaft designed as a recess shaft.

Combinations of double clutch transmissions and double clutch, in which the double clutch is mounted on the transmission shafts, especially on the outer transmission shaft designed as a recess shaft, have been known from the state of the art. The double clutch has a correspondingly centrally arranged rolling bearing for this purpose, with which the double clutch is pressed with an at least slight press fit onto the outer transmission shaft. Since the complete clutch arrangement of the double clutch is arranged recessed in the clutch housing, various requirements arise here, especially for pressing the double clutch with its rolling bearing onto the outer transmission shaft.

Concerning special embodiments of such double clutch, reference shall be made, for example, to DE 10 2009 039 991 A1, DE 10 2009 042 071 A1 as well as DE 10 2009 048 277 A1. It is common to all these constructions that the double clutch or double clutch arrangement is mounted on one of the transmission shafts, especially the outer transmission shaft, of the double clutch transmission via at least one rolling bearing.

Special problems arise here concerning the pressing on, especially concerning the supporting of a corresponding pressing device. Even though the passage holes or threaded holes of the clutch housing, which are present for mounting the clutch housing on the motor vehicle engine, may be generally used to support the pressing rod, it is necessary to provide support devices of different shapes for this in order to make it possible to use the pressing rod in a correspondingly variable manner, because the passage holes or threaded holes are not arranged in a uniformly distributed pattern on the circumference of the clutch housing in different variants of double clutch transmissions or clutch housings due to the construction.

It is known in this connection from the state of the art that support devices for supporting the pressing rod are provided in multiple embodiments, so that a separate support device must be made available for each transmission. However, if new transmission designs are introduced onto the market, especially with, in turn, differently designed clutch housings, a new support device must consequently be made available for each type of clutch housing in order to make it possible to couple this fittingly with the corresponding passage holes and/or threaded holes.

SUMMARY OF THE INVENTION

Accordingly, a basic object of the present invention is to make available a device for pressing a double clutch onto a transmission shaft of a double clutch transmission arranged in a clutch housing of a gearbox, which can be used variably for different embodiments, especially of the clutch housing of the double clutch transmission.

The object is accomplished according to the present invention by a device that comprises: a plurality of tie bolts, which can be stationarily connected to the clutch housing; a pressing device, which is provided with an axially adjustable pressing rod and can be brought into pressing connection with the double clutch; a support device, which connects the tie bolts to the pressing device. The support device has a central mounting element, in which the pressing device is mounted. The support device has a plurality of support arms, which can be caused to mesh with one of the tie bolts each. The support arms are mounted at the mounting element pivotably about a pivot axis extending in parallel to the pressing rod of the pressing device for the concentric alignment of the pressing device with the pressing rod thereof with the transmission shaft.

The design according to the present invention makes available a device that can be used variably for clutch housings of different shapes. In particular, the support device is designed for this purpose in a very special manner. Thus, this support device has, on the one hand, a central mounting element, into which the pressing device can be inserted. This support device is provided, furthermore, with a plurality of support arms, preferably three, which are each mounted pivotably at the mounting element of the support device. The support arms can thus be adjusted in terms of their angular positions in relation to one another at least approximately as desired, so that a concentric alignment of the pressing device with the transmission shaft of the double clutch transmission is possible in a simple manner and this is independent from the particular positioning of the passage holes or threaded holes of the clutch housing. The support arms can thus be aligned freely with these passage holes or threaded holes in a simple manner for different clutch housings with differently arranged passage holes and/or threaded holes. Tie bolts, which can be stationarily coupled, on the one hand, with the passage holes or threaded holes of the clutch housing and, on the other hand, adjustably mesh with the respective support arm, are provided according to the present invention for coupling the support arms and hence the entire support device with these passage holes or threaded holes.

Thus, provisions may be made for the support arms of the support device to have an adjusting slot extending in the longitudinal extension of the respective support arm for adjustably and fixably mounting one tie bolt each. This embodiment makes possible, in particular, the concentric alignment of the pressing device with the transmission shaft of a double clutch transmission in a continuous manner. Due to the fixable mounting of the tie bolts in the respective adjusting slot of the associated support arm, the support arm can be stationarily fixed at the respective tie bolt after the coaxial alignment of the pressing device with the transmission shaft of the double clutch transmission, so that canting is ruled out with certainty during the subsequent pressing-on operation of the double clutch with its rolling bearing onto the transmission shaft.

Furthermore, provisions may be made for the support arms to be able to be fixed in a predetermined angular position in relation to one another at the mounting element and for the mounting element to have a locking screw or an axially adjustable locking pin each, which said screw or pin can be caused to mesh with the respective associated support arm in a non-positive or positive-locking manner, for fixing the angular positions of the individual support arms. Due to this embodiment, the support device can also be used, in particular, to extract such a double clutch. If, for example, three support arms are provided, these may have a set angle of 120° each among each other, so that uniform extraction of a double clutch from the clutch housing or pulling off from the transmission shaft is made possible by means of corresponding draw hooks.

Furthermore, provisions may be made for the mounting element to have a central threaded bushing, and for the pressing rod of the pressing device to be designed as a pressing screw and mounted axially adjustably in a central internal thread of the threaded bushing, and for the threaded bushing to have, in the horizontal alignment of the support arms, an upper mounting cylinder in its upper axial end area and a lower mounting cylinder in its lower axial end area, and for a bearing plate with a bearing bore to be mounted on the upper mounting cylinder, and for a support plate with a bearing bore to be mounted on the lower mounting cylinder, and for the threaded bushing to form, axially between its mounting cylinders, a radially expanded bearing flange, at which the bearing plate is axially supported on the top side and at which the support plate is supported axially on the underside. This embodiment makes possible an extremely simple manufacture of the mounting element, especially for mounting the pressing device, which is preferably designed as a pressing screw, i.e., as a threaded spindle, and can correspondingly be screwed through the internal thread of the threaded bushing. Due to the special embodiment of the threaded bushing with the radially expanded bearing flange thereof, the bearing plate and the support plate have a predefined distance from each other, so that the support arms can be pivotably mounted between these.

Furthermore, provisions may be made for the bearing plate and support plate to be nonrotatably fixed at the bearing flange by means of at least one spring-type straight pin and for the upper bearing plate and lower support plate to form radially outwardly projecting bearing tongues each, and for the bearing tongues of the bearing plate and the bearing tongues of the support plate to be associated with one another in pairs and for mounting one of the support arms between them in pairs in a pivotingly movable manner.

An extremely simple manufacturability and an extremely simple design of the mounting element are achieved, in particular, the mounting of the support arms is solved in an extremely simple manner, and an extremely high inherent stability is achieved due to the bearing tongues being arranged on both sides one on top of another in the axial direction for mounting one of the support arms each.

An extremely simple and functional design of the locking pins, each associated with one of the support arms, is achieved due to the locking pins being of identical design and each having a guide element, with which elements the respective locking pin is screwed into a through thread of the bearing plate, and the respective guide element receiving, in an axially adjustable manner, a locking pin, which can be brought from a fixing position, in which it meshes axially with a fixing hole of the respective support arm, into a retracted neutral position, in which it does not mesh with the fixing hole.

To release the locked position of the particular locking pin with its locking pin, provisions may, furthermore for the locking pin to have a tie rod, which is provided in its end area located axially opposite the locking pin with an external thread, with which the tie rod is screwed into an actuating element, and for the actuating element nonrotatably meshing with a locking web in a top-side cross slot of the guide element in the locked position of the locking pin. Together with the locking pin, this actuating element can be retracted in the axial direction against a spring force, so that the “locking” meshing of the locking pin with the corresponding support arm is abolished and this pin can be pivoted approximately as desired.

To secure the non-locking or locking, neutral position of the locking pin the actuating element can be axially extracted from the cross slot of the guide element with the locking web. The locking web is thus disengaged from the cross slot of the guide element in this neutral position of the locking pin. To secure this axially retracted, neutral position, the actuating element can be caused to mesh with a locking groove arranged extending at right angles to the cross slot on the top side of the guide element by rotation by 90° in relation to the cross slot. This locking groove has, contrary to the cross slot of the guide element, only an extremely small axial depth, so that the locking pin, which is connected to the actuating element, cannot certainly mesh in this retracted position with the associated support arm.

The present invention will be explained in more detail below as an example based on the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
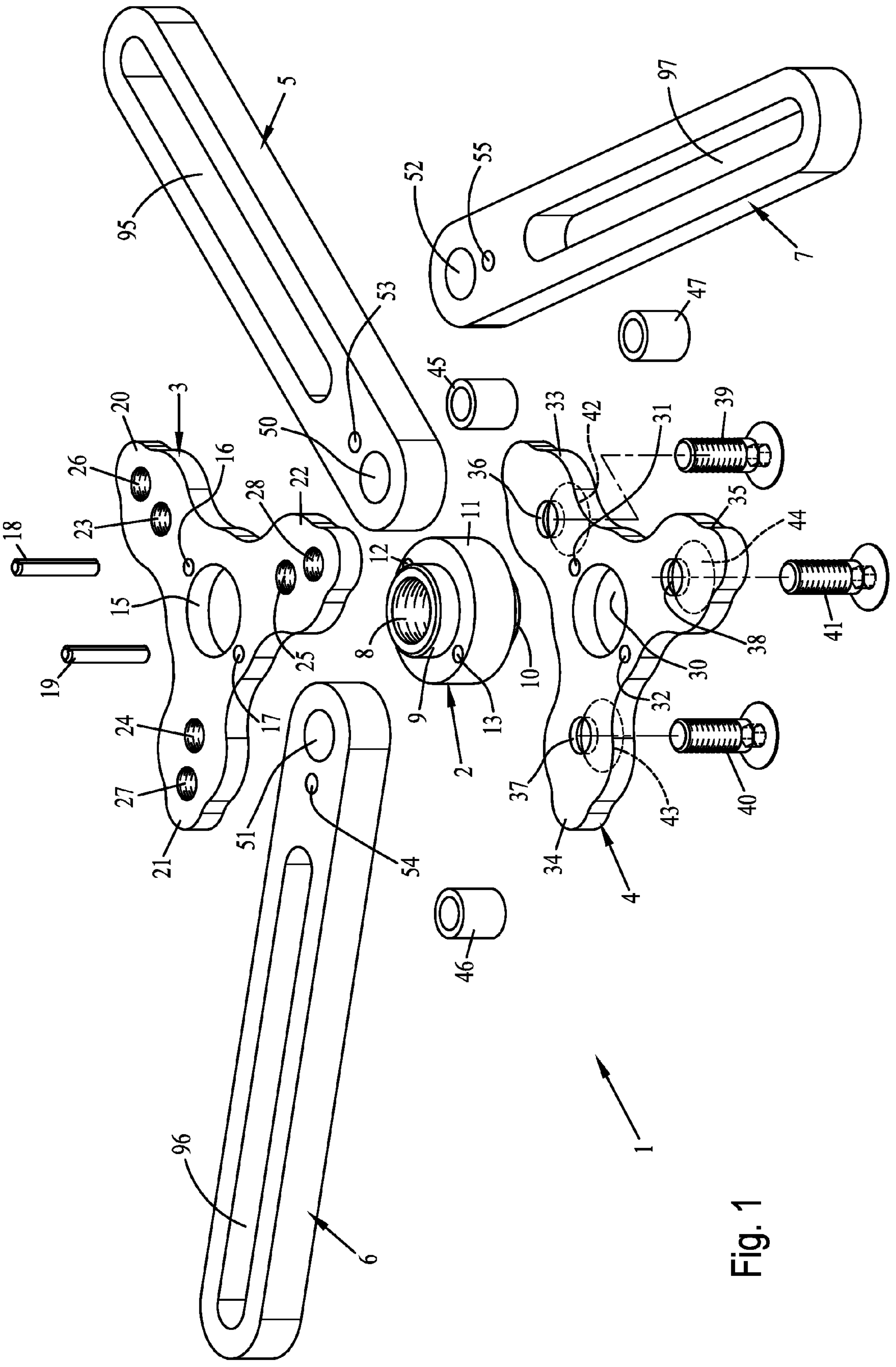
FIG. 1 is a perspective exploded view of a support device with a bearing plate, a threaded bushing and a support plate as well as three support arms together with two grooved pins as well as three fitting bolts and bearing bushes.

Referring to the drawings in particular, FIG. 1 shows a perspective exploded view of a support device 1, which comprises a central threaded bushing 2 of an "upper" bearing plate 3, a "lower" support plate 4 as well as a total of three support arms 5, 6 and 7 in the exemplary embodiment being shown. Four or more support arms may also be provided instead of three support arms 5, 6 and 7.

The threaded bushing 2 has a central internal thread 8, which is used during the operation for mounting a pressing device in an axially adjustable manner. Furthermore, it is seen in FIG. 1 that the threaded bushing 2 forms a respective mounting cylinder 9 and 10 in its upper end area and in its lower end area, but mounting cylinder 10 can be seen in the form of a suggestion only. Between these two mounting cylinders 9 and 10, threaded bushing 2 forms a radially expanded bearing flange 11, which is provided in this exemplary embodiment with two diametrically opposite through holes 12 and 13, which extend in parallel to the internal thread 8 of the threaded bushing.

Bearing plate 3 has a central bearing bore 15, with which bearing plate 3 can be fittingly attached to the upper mounting cylinder 9 of threaded bushing 2. Two likewise diametrically opposite through holes 16 and 17 are arranged in bearing plate 3 in the edge area of the bearing bore 15. In the mounted state, these through holes 16 and 17 of the mounting plate 3 can be aligned flush with the two through holes 12 and 13 of bearing collar 11 of threaded bushing 2. Two spring-type straight pins 18 and 19, which can be inserted into the respective through holes 16 and 17 as well as 12 and 13 in a correspondingly clamping manner, are provided in this flush alignment for nonrotatably fixing the bearing plate 3 relative to threaded bushing 2.

It can also be seen from FIG. 1 that bearing plate 3 forms a total of three radially outwardly projecting bearing tongues 20, 21 and 22, which have a relative angular position of 120° relative to one another. Each of the bearing tongues 20, 21 and 22 is provided with a respective mounting thread 23, 24 and 25 located radially inside. Radially outside of the mounting threads 23, 24 and 25, each of the bearing tongues 20, 21 and 22 has a respective through thread 26, 27 and 28, whose function will be explained later.

The lower support plate 4 is likewise provided with a central bearing bore 30, with which support plate 4 can be fittingly attached to the lower mounting cylinder 10 of threaded bushing 2. Furthermore, support plate 4 likewise has, in the edge area of its bearing bore 30, two diametrically opposite through holes 31 and 32, which can be aligned, in the mounted state of support plate 4 on the mounting cylinder 10, flush with the through holes 12 and 13 of bearing collar 11 of threaded bushing 2. The two spring-type straight pins 18 and 19 are shown in terms of their length such that these pass through the through holes 12, 16 and 31 as well as 13, 17 and 32 in the mounted state of bearing plate 3 and of support plate 4 on threaded bushing 2, so that both the upper bearing plate 3 and lower support plate 4 are held nonrotatably at threaded bushing 12 or the bearing collar 4 thereof by the two spring-type straight pins 18 and 19. Furthermore, support plate 4 is also provided with a total of three radially outwardly projecting bearing tongues 33, 34 and 35, which correspond in terms of their shape and alignment to the bearing tongues 20, 21 and 22 of the upper bearing plate 3. Thus, the bearing tongues 20 and 33, 21 and 34 as well as 22 and 35 are associated with one another each in pairs and are arranged flush "one after another" in the mounted state.

Furthermore, it can be seen from FIG. 1 that each of the bearing tongues 33, 34 and 35 has a mounting hole 36, 37, 38 each, through which corresponding fitting bolts 39, 40 and 41 can be passed. These fitting bolts 39, 40 and 41 are designed as "countersunk head bolts" and can be inserted into respective recesses 42, 43 and 44 of the respective mounting holes 36, 37 and 38, which recesses are arranged correspondingly on the underside.

A bearing bush 45, 46 and 47, respectively, whose axial length approximately corresponds to the axial height of the support arms 5, 6 and 7, respectively, is associated with each of the fitting screws 39, 40 and 41, respectively. The axial length of the bearing bushes 45, 46 and 47 is preferably minimally greater than the axial height of the respective corresponding support arm 5, 6 and 7, so that these support arms 5, 6 and 7 cannot be jammed between the associated bearing tongues 20, 33 and 21, 34 and 22, 35, respectively, in the mounted state, but remain freely movable. Provisions may also be made for the bearing collar 11 of threaded bushing 2 to be made higher in its axial extension in the direction of the internal thread 2 than the axial height of the support arms 5, 6 and 7. An undesired jamming of the support arms 5, 6, 7 between the associated bearing tongues 20, 33 and 21, 34 and 22, 35, respectively, is avoided with certainty by such an embodiment as well.

For the correspondingly pivotable mounting of the support arms 5, 6 and 7, each of the support arms 5, 6 and 7 is provided in an end area each with a corresponding bearing bore 50, 51 and 52, respectively, with which the corresponding support arm 5, 6 and 7 can be attached to the corresponding bearing bushes 45, 46 and 47 belonging to it fittingly or with a small clearance.

The mounting holes 36, 37 and 38 are arranged in the corresponding bearing tongue 33, 34 and 35 belonging to them corresponding to the mounting threads 23, 24 and 25 of the bearing tongues 20, 21 and 22 of the upper bearing plate 3, so that these are located flush one after another in the mounted state. It is easy to imagine that the corresponding fitting bolts 39, 40 and 41 pass through the mounting holes 36, 37 and 38 as well as the corresponding bearing bushes 45, 46 and 47 and are screwed correspondingly into the mounting threads 23, 24 and 25. The bearing plate 3 and support plate 4 are thus held stationarily at the threaded bushing 2 in this mounted state. At the same time, the corresponding bearing bushes 45, 46 and 47 are fixed by these fitting bolts 39, 40 and 41, so that the attached support arms 5, 6 and 7 are correspondingly mounted in a pivotable manner.

It is also seen in FIG. 1 that a fixing hole each, whose center distance from the respective bearing bore 50, 51 and 52 corresponds to the center distance of the respective associated mounting thread 23, 24 and 25 from the respective corresponding through thread 26, 27 and 28, is arranged adjacent to the bearing bores 50, 51 and 52 of the respective support arm 5, 6 and 7. Due to these fixing holes 53, 54 and 55, the support arms 5, 6 and 7 can be fixed in a predetermined angular position in relation to one another, preferably 120°. A corresponding locking pin, which meshes in the predetermined angular position of the support arms 5, 6 and 7 in relation to one another with the corresponding fixing hole 53, 54 and 55 of the corresponding support arm 5, 6 and 7 in a positive-locking manner, can be screwed for this into the respective corresponding through thread 26, 27 and 28. Instead of such a positive-locking connection, a locking screw or the like may also be provided in order to fix the support arms 5, 6 and 7 in a corresponding angular position in relation to one another.

Figure 2:
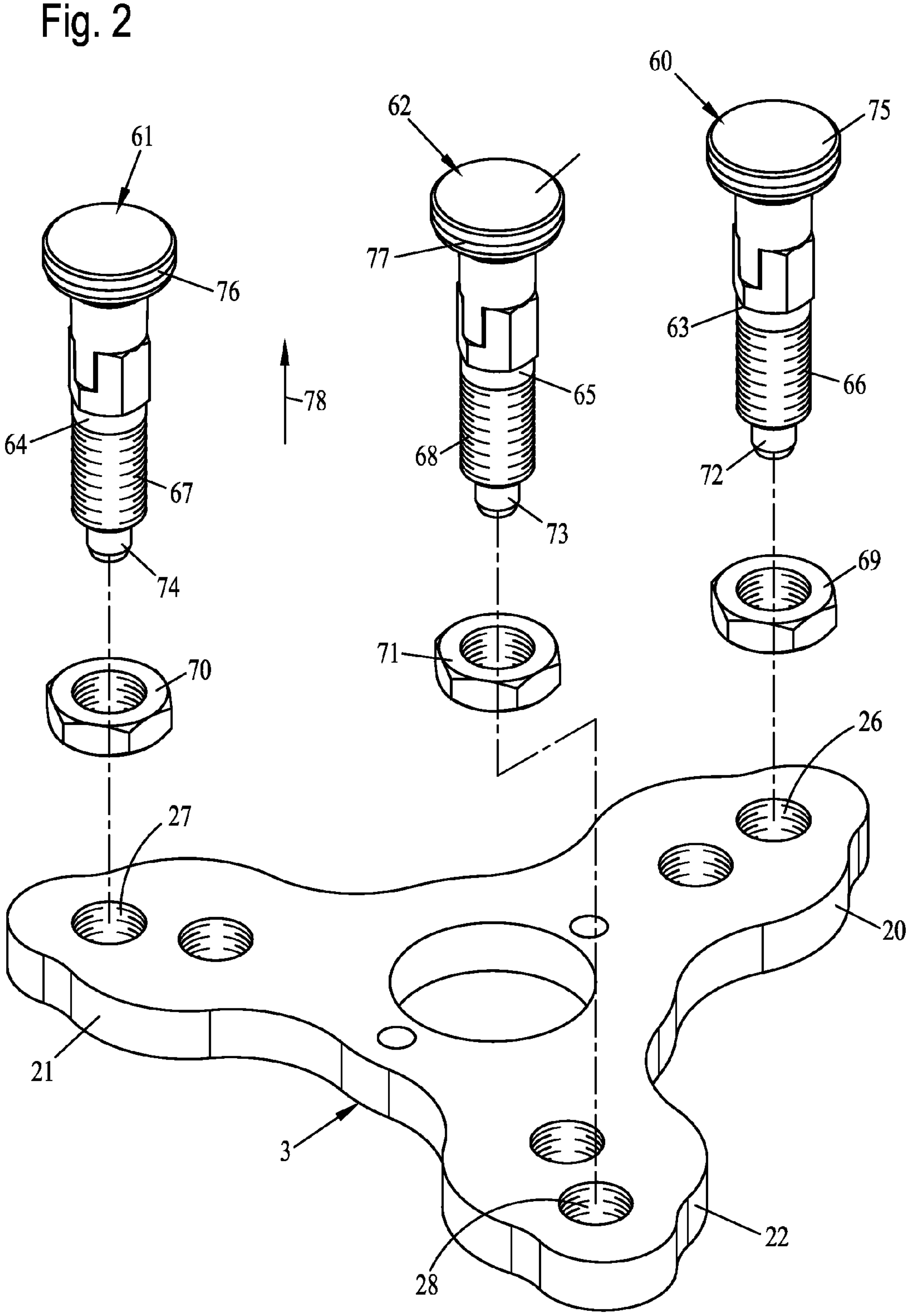
FIG. 2 is a perspective view of the bearing plate from FIG. 1 together with three adjustable locking pins, which are provided for fixing a predetermined angular position of the support arms from FIG. 1.

FIG. 2 shows for this a perspective exploded view of the bearing plate 3 together with a total of three locking pins 60, 61 and 62. These locking pins 60, 61 and 62 have a multipart design in the exemplary embodiment shown. Thus, a guide element 63, 64 and 65 each is provided, which has a cylindrical design and is provided with an external thread 66, 67 and 68, respectively, in its end area directed towards the bearing plate 3. The respective guide element 63, 64 and 65 can be screwed with this external thread 66, 67 and 68 into the respective associated through thread 26, 27 and 28 of the respective bearing tongue 20, 21 and 22. To fix and lock the depth of adjustment, a lock nut 69, 70 and 71, respectively, which can be correspondingly screwed onto the corresponding external thread 66, 67 and 68, is associated with each guide element 63, 64 and 65, respectively.

Furthermore, it can be seen from FIG. 2 that each locking pin 60, 61 and 62 has an axially downwardly projecting locking pin 72, 73 and 74 in the "locked position" shown in FIG. 2. This locking pin 72, 73 and 74 is in functional connection with an actuating element 75, 76 and 77 projecting on the top side and can be brought from the locked position shown in FIG. 2 into a neutral position, in which it does not project vertically downward from the guide element 63, 64 and 65, by an adjusting motion in the direction of arrow 67 of the respective actuating element 75, 76 and 77. Thus, in this neutral position of the respective locking pin 72, 73 and 74 and in case of a corresponding screwed-in depth of the guide elements 63, 64 and 65, the respective locking pin 72, 73 and 74 does not project downwardly beyond the corresponding bearing tongue 20, 21 and 22, so that the respective locking pin 72, 73, 74 does not mesh with the respective associated fixing hole 53, 54 and 55 of the respective support arm 5, 6 and 7 any longer. Thus, the support arms 5, 6 and 7 are mounted in a freely pivotably movable manner between the respective corresponding bearing tongues 20, 33 and 21, 34 and 22, 35 from FIG. 1 in this retracted neutral position of the locking pins 72, 73 and 74.

Figure 3:
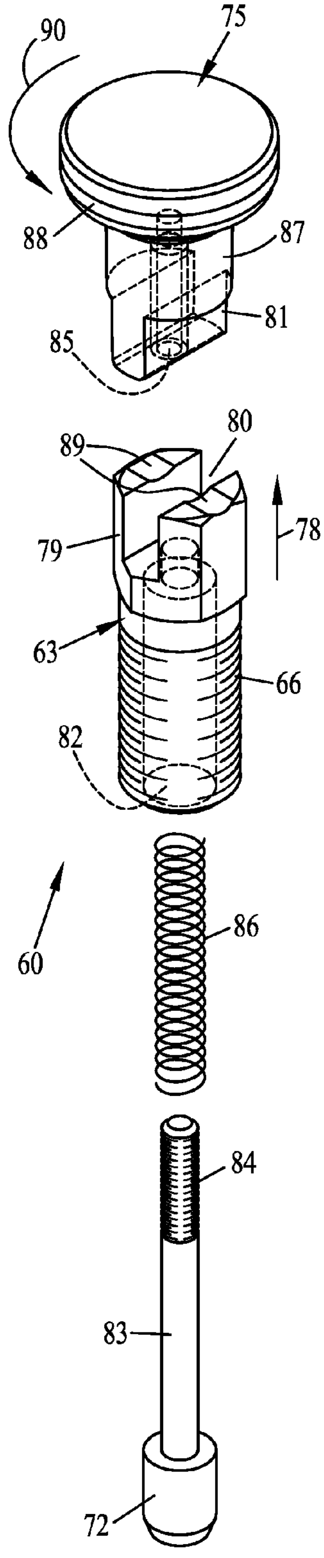
FIG. 3 is a perspective exploded view of the individual components of one of the locking pins from FIG. 2.

FIG. 3 shows the individual elements of, for example, the locking pin 60 in a perspective exploded view. The description given in connection with FIG. 3 is also applicable to these corresponding to the identical design of the locking pins 62 and 61.

As is apparent from FIG. 3, guide element 63 is provided with its external thread 66 with a hexagon insert bit 79 in its upper end area. In the area of this hexagon insert bit 79, guide element 63 has a recessed cross slot 80, with which a locking web 81 of the actuating element 75 meshes in the locked position in a positive-locking and nonrotatable manner. It is also seen in FIG. 3 that guide element 63 has a central through hole 82, in which locking pin 72 is guided in an axially adjustable manner in the mounted state.

In the axial extension upwards towards the guide element 63, locking pin 73 forms a tie rod 83, which is provided with an external thread 84 in its upper end area. With this external thread 84, the tie rod 83 can be screwed into a corresponding internal thread 85 of actuating element 75 in a defined manner. Furthermore, axial compression spring 86 is provided, by which the centering pin 72 is held in its locked position shown in FIG. 2 if the locking web 81 of actuating element 75 meshes with the cross slot 80 of guide element 63, as this can also be seen in FIG. 2. Above locking web 81, actuating element 75 forms a cylindrical section 87, with which a radially expanded holding plate 88 is made integral in one piece on the top side.

Furthermore, it can be seen from FIG. 3 that the upper front surface of guide element 63 is provided with a locking groove 89, which extends at right angles to cross slot 80 and is interrupted by cross slot 80. Locking web 81 can be caused to mesh with this locking groove 89 after rotating the actuating element 75 by 90° in the direction of arrow 90 after retraction in the direction of arrow 78.

Figure 4:
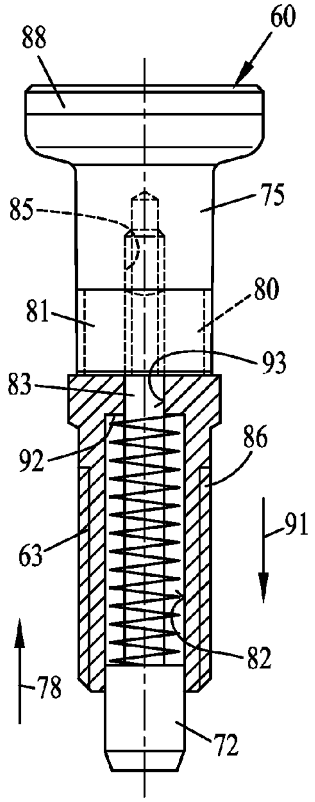
FIG. 4 is a partial vertical section of the mounted components of the locking pin from FIG. 3.

FIG. 4 shows a partial vertical section of locking pin 60 from FIGS. 2 and 3 in the mounted state. FIG. 4 shows the active locked position, in which locking pin 72 projects vertically downwardly in the direction of arrow 91 from guide element 63. In this locked position of the locking pin 72, the pin is guided in through hole 82. Above the locking pin 72 is arranged the axial compression spring 86, which is axially supported on the top side at a ring-shaped wall element 92 of through hole 82 of guide element 63. Tie rod 83 correspondingly passes through a radially tapered hole section 93 of through hole 82 and is screwed stationarily into the internal thread 85 of actuating element 75. Actuating element 75 is mounted with its locking web 81 in the cross slot 80 of guide element 63, which said cross slot is indicated by broken line.

It can be seen that locking pin 72 is held by the axial compression spring 86 in the locked position shown in FIG. 4. This locking pin 72 meshes in this position with the fixing hole 54 of support arm 5 in a positive-locking manner in the state in which it is mounted in the bearing plate 3, so that this support arm 5 is fixed in a predetermined angular position relative to the two bearing tongues 20 and 33 of bearing plate 3 and of support plate 4. To release this locked position, locking pin 72 is to be raised in the direction of arrow 78 via its holding plate 88 and can then be rotated, as was already mentioned in connection with FIG. 3, in the direction of arrow 90 by 90°.

Figure 5:
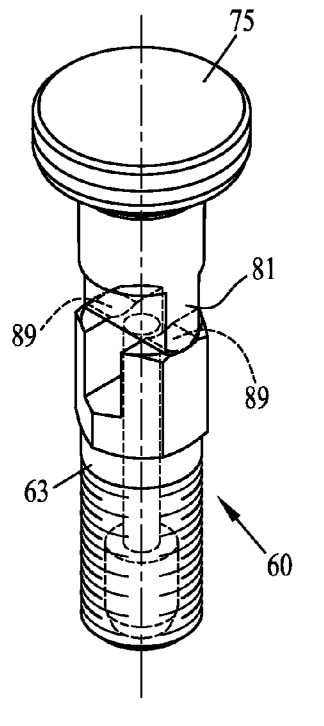
FIG. 5 is a perspective view of the locking pin from FIG. 4 in its unlocked, neutral position.

FIG. 5 shows for this a perspective view of this neutral, retracted position of actuating element 75 as well as of locking pin 72. It can be seen that locking pin 72 is fully retracted and is located completely in the guide element 63. To secure this locked position, actuating element 75 with its locking web 81 meshes with the top-side locking groove 89 in a positive-locking manner, so that this angle of rotation position of actuating element 75 is secured.

Figure 6:
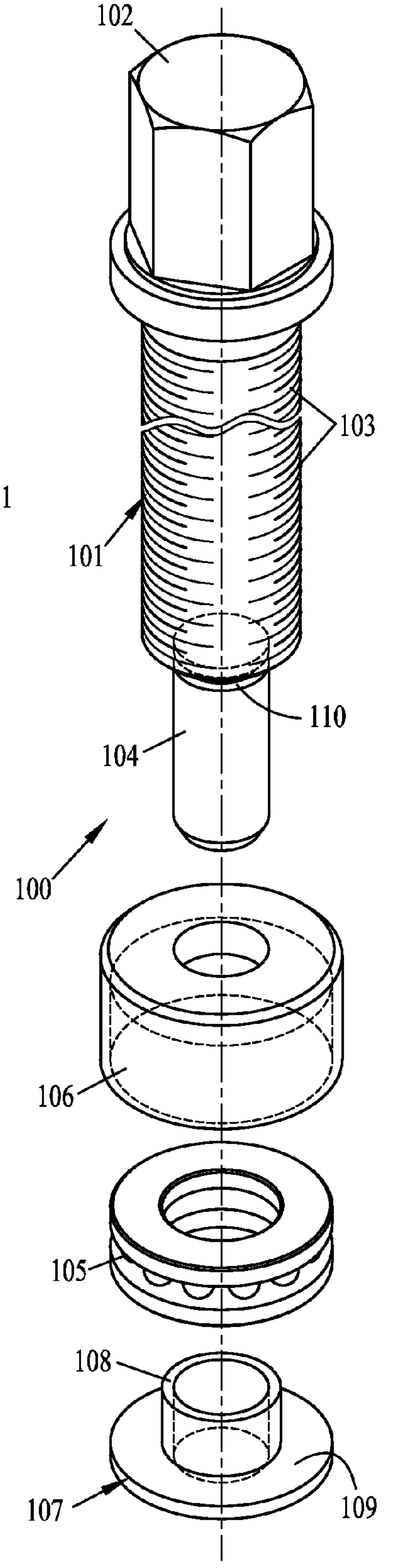
FIG. 6 is a perspective exploded view of a pressing device with a pressing rod designed as a pressing screw together with a bearing housing and a thrust bearing.

FIG. 6 shows a perspective exploded view of the components of pressing device 100. This pressing device 100 is formed in this exemplary embodiment by a pressing rod designed as a pressing screw 101. In its upper end area, this pressing screw 101 has a corresponding hexagon insert bit 102, which is joined downwardly by an adjusting thread 103. The pressing screw 101 can be screwed with this adjusting thread 103 into the internal thread 8 of threaded bushing 2 (FIG. 1) in an axially adjustable manner.

In the axial extension of the adjusting thread 103 downwardly, pressing screw 101 forms a guide pin 104, which is used to concentrically receive a thrust bearing 105. A bearing housing 106, which fittingly receives the thrust bearing 105, is provided in this exemplary embodiment for the concentric fixation of this thrust bearing 105. Furthermore, a guide bushing 107, which forms an upwardly directed guide cylinder 108 provided with a through hole, can be inserted into the thrust bearing 105. Furthermore, a circumferential, axially expanded ring web 109, with which guide bushing 107 can be fittingly inserted into the bearing housing 106 and can be fixed in same, for example, by flanging the bearing housing, is provided in the lower end area of guide bushing 107.

Together with guide bushing 107 and thrust bearing 105, bearing housing 106 thus forms a uniform bearing element. To fix this bearing element, especially with its guide cylinder 108 on the guide pin 104, guide pin 104 has, in its upper end area, an O-ring 110, onto which the guide cylinder 108 can be slidingly pushed.

Figures 7, 8, 9:
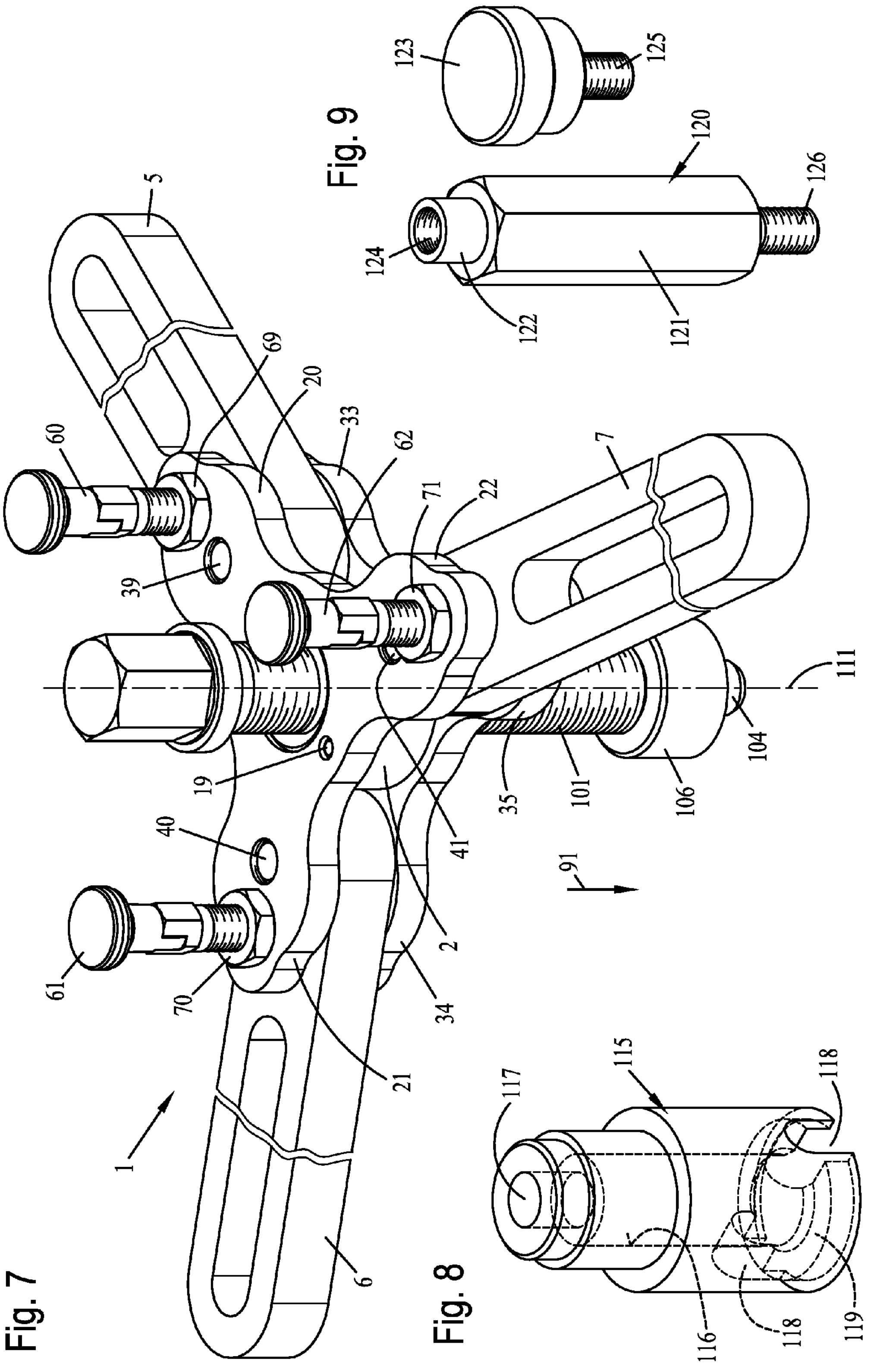
FIG. 7 is a perspective view of a mounted support device from FIG. 1 with the pressing device inserted, wherein the support arms are shown shortened in their length in this view.
FIG. 8 is a perspective view of a pressing sleeve, which can be brought into functional connection with the pressing screw from FIG. 6 as well as with the thrust bearing from FIG. 6 for pressing on a double clutch.
FIG. 9 is perspective exploded view showing an embodiment variant of a tie bolt together with a fitting bolt.

FIG. 7 shows a perspective view of the support device 1 in the mounted state. The support arms 5, 6 and 7 are shown shortened in their longitudinal extension in FIG. 7.

It can be seen that the support arms 5, 6 and 7 are fittingly mounted between the bearing tongues 20, 33 and 21, 34 and 22, 35, which are associated with each other in pairs. The three locking pins 60, 61 and 62 are correspondingly screwed into the upper bearing tongues 20, 21 and 22 of bearing plate 3 in an axially defined position and secured by the corresponding lock nuts 69, 70 and 71. All locking pins are in their locked positions in the position shown in FIG. 7, so that the support arms 5, 6 and 7 extend each radially in relation to the central longitudinal axis 111 of threaded bushing 2 or pressing screw 101 inserted into same. In this locked position of the support arms 5, 6 and 7, these extend at an angle of 120° each radially in relation to one another.

Furthermore, it can be seen that bearing housing 106 is stationarily attached to the guide pin 104. This guide pin 104 extends downwardly beyond the bearing housing 106 in the direction of arrow 91. Furthermore, it can also be seen from FIG. 7 that the fitting bolts 39, 40 and 41 are screwed into bearing plate 3. The spring-type straight pin 19 inserted can be seen as well.

To make it possible now to press a double clutch with its rolling bearing onto a transmission shaft, a pressing sleeve 115 is provided, which can be seen, for example, in the perspective view in FIG. 8. This pressing sleeve 115 has a stepped through hole 116, which forms a radially tapered bearing section 117 in its upper end area. The pressing sleeve 115 can be attached to the guide pin 104 of pressing screw 101 with this bearing section 117 fittingly and with a small clearance. The internal diameter of through hole 116 in its radially expanded area is coordinated with the diameter of a transmission shaft, onto which the double clutch with its rolling bearing is to be pressed.

Furthermore, it can be seen from FIG. 8 that two diametrically opposite openings 118, which are open downwardly and which are used for inspection during pressing on, are provided in the lower end area of the pressing sleeve. To press the rolling bearing of the double clutch onto the outer transmission shaft designed as a recess shaft at a predetermined "press-on depth," through hole 116 has a radially expanded stop 119 in the area of the two openings 118, and the stop is arranged correspondingly recessed in the pressing sleeve 115. When the predetermined press-on depth is reached, this stop 119 will mesh with the upper front ring surface of the transmission shaft (not shown in the drawing), so that a further pressing in is not possible any more. To avoid a further actuation and hence possible damage to the transmission shaft and/or pressing sleeve to the extent possible, two openings 118 are provided. The human operator can recognize through these when the maximum press-on depth is reached.

FIG. 9 shows a perspective exploded view of an embodiment variant of a tie bolt 120, which forms a hexagon insert bit 121 over its entire length in the exemplary embodiment being shown. The tie bolt 120 is provided in its upper end area with a mounting cylinder 122, with which tie bolt 120 can be inserted into one of the adjusting slots 95, 96 and 97 (FIG. 1) of one of the support arms 5, 6 and 7, respectively. The axial length of the mounting cylinder 122 is made shorter than the height of the corresponding support arm 5, 6 and 7, so that a position of the tie bolt 120 set in the adjusting slot 95, 96 and 97 can be stationarily fixed by means of a locking screw 123. In the area of its mounting cylinder 122, tie bolt 120 correspondingly has an internal thread 124, into which the locking screw 123 can be screwed with a corresponding threaded pin 125. Downwardly, tie bolt 120 has a mounting thread 126, with which the tie bolt 120 can be stationarily screwed into an existing internal thread of a clutch housing. This mounting thread 126 may also be made considerably longer in order to make it possible, for example, to pass it through a through hole in a flange area of a clutch housing. To make it possible to secure a stationary mounting in such a case, a corresponding clamping nut (not shown in the drawing) is to be provided.

Figure 10:
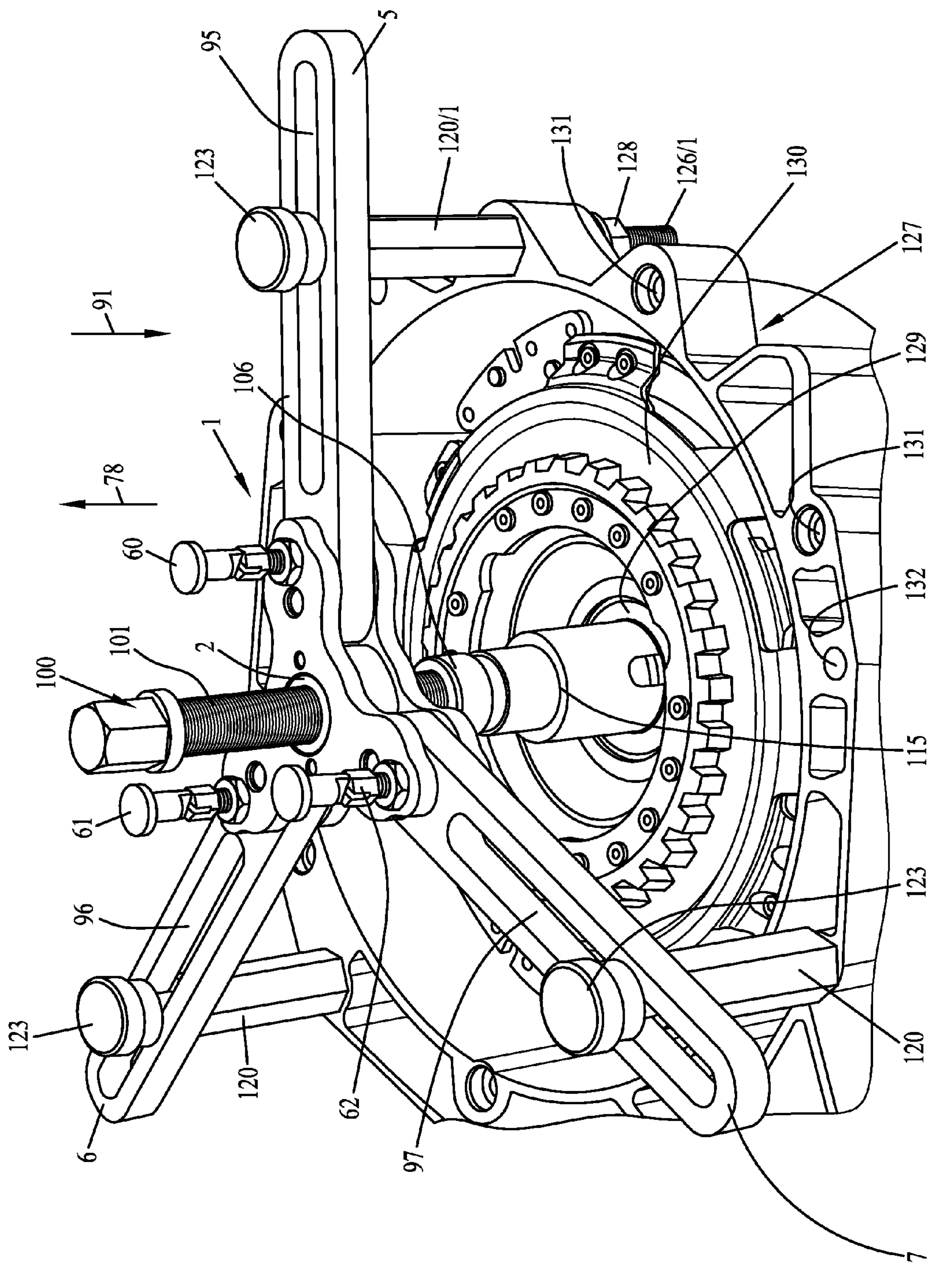
FIG. 10 is a perspective view of a device according to the present invention in its state in which it is brought into contact with a clutch housing of a double clutch transmission.

FIG. 10 shows a photographic image of the support device 1 attached to a clutch housing 127. It can be seen that two tie bolts 120 are screwed in stationarily with corresponding internal threads of the clutch housing, which said internal threads cannot be seen in the figure. Furthermore, a second variant of such a tie bolt 120/1, which is provided with the above-mentioned extended mounting thread 126/1, can be seen on the right-hand side of FIG. 10. The tie bolt 120/1 is passed with this mounting thread 126/1 through a corresponding through hole of the clutch housing 127 and stationarily fixed by means of a corresponding clamping nut 128.

Furthermore, it can be seen from FIG. 10 that the locking pins 60, 61 and 62 are in their neutral position in which they are retracted in the direction of arrow 78, so that the support arms 5, 6 and 7 are pivotable relative to one another. The pressing screw 101 is screwed through the threaded bushing 2 and it presses with the thrust bearing of the bearing housing 106, which said bearing cannot be seen, against the pressing sleeve 115 on the top side. This pressing sleeve presses, in turn, in the direction of arrow 91, against a rolling bearing 129 of a double clutch 130 located in the clutch housing 127.

It can be seen from FIG. 10 that based on the pivotable adjustability of the three support arms 5, 6 and 7 relative to one another, these can be aligned approximately as desired towards one of the through holes 131 or internal threads 132 of the clutch housing 127. Due to this pivotability and due to the adjusting slots 95, 96 and 97 provided in the support arms 5, 6 and 7, the pressing screw 101 can be aligned, furthermore, together with the pressing sleeve 115, concentrically with the double clutch 130 and hence with the rolling bearing 129 thereof. By subsequently tightening the locking screws 123, the support device 1 can be stationarily fixed together with the pressing device 100 in this concentric alignment. By subsequently actuating the pressing screw 101, the double clutch 130 with its rolling bearing 129 can thus be pressed onto a transmission shaft (not visible in the drawing).

Due to the possibility of fixing the support arms 5, 6 and 7, this support device 1 can, in particular, also be used to extract such a double clutch 130 by inserting corresponding draw hooks into the adjusting slots 95, 96 and 97 instead of the tie bolts 120. Especially due to a relative angular position of the support arms 5, 6 and 7, preferably equaling 120° each relative to one another, which can be set by the locking pins 60, 61 and 62, pulling forces can thus be uniformly applied to the double clutch 130, so that jamming especially of the rolling bearing 129 on the transmission shaft is avoided during extraction.

While specific embodiments of the invention have been shown and described in detail to illustrate the application of the principles of the invention, it will be understood that the invention may be embodied otherwise without departing from such principles.

What is claimed is:

1. A device for pressing a double clutch onto a transmission shaft of a double clutch transmission, which transmission shaft is arranged in a clutch housing of a transmission housing, the device comprising:

a plurality of tie bolts for stationary connection to the clutch housing;

a pressing device with an axially adjustable pressing rod for pressing connection with the double clutch; and a support device connecting the tie bolts to the pressing device, the support device having a central mounting element, in which the pressing device is mounted and a plurality of support arms each with a tie bolt receiving portion for meshing with one of the tie bolts, the support arms being each mounted at the mounting element pivotably about a respective pivot axis extending in parallel to the pressing rod for a concentric alignment of the pressing device with the pressing rod thereof with the transmission shaft, the mounting element having a central threaded bushing, the pressing rod of the pressing device comprising a pressing screw adjustably mounted in a central internal thread of the threaded bushing, the threaded bushing having an upper mounting cylinder in an upper axial end area and a lower mounting cylinder in a lower axial end area for a horizontal alignment of the support arms, the support device including a bearing plate with a bearing bore mounted on the upper mounting cylinder, the support device including a support plate with a bearing bore mounted on the lower mounting cylinder, the threaded bushing forms, axially between the upper and lower mounting cylinders, a radially expanded bearing flange at which the bearing plate is supported axially on the top side and the support plate is supported axially on the underside.

2. A device in accordance with claim 1, wherein the support arms, of the support device, have an adjusting slot extending in the longitudinal extension of the respective support arm as the tie bolt receiving portion, each for mounting a tie bolt in an adjustable and fixable manner.

3. A device in accordance with claim 1, wherein:

the mounting element has a locking screw or an axially adjustable locking pin for meshing with a respective associated support arm in a nonpositive or positive-locking manner for fixing the angular positions of the individual support arms; and each of the support arms is fixable in a predetermined angular position in relation to one another at the mounting element.

4. A device in accordance with claim 1, wherein:

the bearing plate and the support plate are nonrotatably fixed at the bearing flange via at least one spring-type straight pin;

the upper bearing plate and lower support plate each form radially outwardly projecting bearing tongues; and the bearing tongues of the bearing plate and the bearing tongues of the support plate are associated with each other in pairs and receive between them in pairs one of the support arms in a pivotingly movable manner.

5. A device in accordance with claim 3, wherein:

the locking pins have an identical design and each have a guide element with which the respective locking pin is screwed into a through thread of the bearing plate; and each respective guide element axially adjustably receives a locking pin which can be brought from a fixed position, in which the locking pin axially meshes with a fixing hole of the respective support arm, into a retracted, neutral position, in which the locking pin does not mesh with the fixing hole.

6. A device in accordance with claim 5, wherein locking pin has a tie rod, which is provided with an end area, located at an axially opposite end of the locking pin, with an external thread with which the tie rod is screwed into an actuating element, and the actuating element nonrotatably meshes with a top-side cross slot of the guide element with a locking web in the locked position of the locking pin.

7. A device in accordance with claim 6, wherein actuating element can be caused to mesh with a locking groove arranged extending at right angles to the cross slot on the top side on guide element by a rotation by 90° in relation to the cross slot.

8. A device for pressing a double clutch onto a transmission shaft of a double clutch transmission, which transmission shaft is arranged in a clutch housing of a transmission housing, the device comprising:

a plurality of tie bolts with connection means for stationary connection to the clutch housing;

a pressing device with an axially adjustable pressing rod for pressing connection with the double clutch;

a mounting element having a central threaded bushing, the pressing rod of the pressing device comprising a pressing screw adjustably mounted in a central internal thread of the threaded bushing, the threaded bushing having an upper mounting cylinder in an upper axial end area and a lower mounting cylinder in a lower axial end area for a horizontal alignment of the support arms;

a plurality of support arms, each of the support arms having a tie bolt receiving portion for engaging one of the tie bolts, each of the support arms being adjustably mounted at the mounting element, each of the support arms having a pivot axis extending in parallel to a direction of extent of the pressing rod for adjustment of each of the support arms and for adjustment of a position of each of the tie bolts for a concentric alignment of the pressing rod with the transmission shaft;

a bearing plate with a bearing bore mounted on the upper mounting cylinder;

a support plate with a bearing bore mounted on the lower mounting cylinder, the threaded bushing forms, axially between the upper and lower mounting cylinders, a radially expanded bearing flange at which the bearing plate is supported axially on the top side and the support plate is supported axially on the underside.

9. A device in accordance with claim 8, wherein:

the mounting element and the plurality of support arms form a support device.

10. A device in accordance with claim 9, wherein:

each of the support arms have an adjusting slot extending in the longitudinal extension of the respective support arm as the tie bolt receiving portion, each for mounting a tie bolt in an adjustable and fixable manner.

11. A device in accordance with claim 9, wherein:

the mounting element has a plurality of flocking screw or axially adjustable locking pins, each for engaging with a respective associated support arm in a nonpositive or positive-locking manner for fixing the angular positions of each of the support arms relative to the mounting element individually; and each of the support arms is fixable in a predetermined angular position in relation to one another at the mounting element.

12. A device in accordance with claim 8, wherein:

the bearing plate and the support plate are nonrotatably fixed at the bearing flange via at least one spring-type straight pin;

the upper bearing plate and lower support plate each form radially outwardly projecting bearing tongues; and the bearing tongues of the bearing plate and the bearing tongues of the support plate are associated with each other in pairs and receive between them in pairs one of the support arms in a pivotingly movable manner.

13. A device in accordance with claim 11, wherein:

the locking pins have an identical design and each have a guide element with which the respective locking pin is screwed into a through thread of the bearing plate; and each respective guide element axially adjustably receives a locking pin which can be brought from a fixed position, in which the locking pin axially engages with a fixing hole of the respective support arm, into a retracted, neutral position, in which the locking pin does not engage with the fixing hole.

14. A device in accordance with claim 13, wherein:

each of the locking pins has a tie rod, which is provided with an end area located axially opposite a remaining portion of the locking pin, the end area having an external thread, with which an associated tie rod is screwed into an actuating element that nonrotatably engages with a top-side cross slot of the guide element with a locking web in a locked position of locking pin.

15. A device in accordance with claim 14, wherein actuating element can be caused to engage with a locking groove arranged extending at right angles to the cross slot on the top side on guide element by a rotation by 90° in relation to the cross slot.

16. A device in accordance with claim 8, further comprising:

a plurality of locking pins movably mounted on one of the bearing plate and the support plate between a first position and a second position, each of the plurality of locking pins selectively fixing one of the support arms in one predetermined angular position about a respective pivot axis in the first position, each of the plurality of locking pins in the second position allowing rotation of the respective support arm about the respective pivot axis.

17. A device in accordance with claim 16, wherein:

the predetermined angular positions of the support arms are angularly spaced 120 degrees from adjacent support arms;

each of the support arms define a fixing hole receiving the respective locking pin in the first position to fix the respective support arm in the one predetermined angular position;

each of the locking pins being removed from the respective fixing hole in the second position.

18. A device for pressing a double clutch onto a transmission shaft of a double clutch transmission, which transmission shaft is arranged in a clutch housing of a transmission housing, the device comprising:

a plurality of tie bolts for stationary connection to the clutch housing;

a pressing device with an axially adjustable pressing rod for pressing connection with the double clutch; and a support device connecting the tie bolts to the pressing device, the support device having a central mounting element, in which the pressing device is mounted and a plurality of support arms each with a tie bolt receiving portion for meshing with one of the tie bolts, the support arms being each mounted at the mounting element pivotably about a respective pivot axis extending in parallel to the pressing rod for a concentric alignment of the pressing device with the pressing rod thereof with the transmission shaft;

a bearing plate mounted on the mounting element;

a plurality of axially adjustable locking pins on the mounting element each meshing with a respective associated support arm in a nonpositive or positive-locking manner for fixing the angular positions of the individual support arms, each of the support arms being fixable in a predetermined angular position in relation to one another at the mounting element, the locking pins having identical designs and each having a guide element with which the respective locking pin is screwed into a through thread of the bearing plate, each respective guide element axially adjustably receiving a locking pin which can be brought from a fixed position, in which the locking pin axially meshes with a fixing hole of the respective support arm, into a retracted, neutral position, in which the locking pin does not mesh with the fixing hole, each of the locking pins having a tie rod, which is provided with an end area, located at an axially opposite end of the locking pin, with an external thread with which the tie rod is screwed into an actuating element, and the actuating element nonrotatably meshes with a top-side cross slot of the guide element with a locking web in the locked position of the locking pin.

19. A device for pressing a double clutch onto a transmission shaft of a double clutch transmission, which transmission shaft is arranged in a clutch housing of a transmission housing, the device comprising:

a plurality of tie bolts with connection means for stationary connection to the clutch housing;

a pressing device with an axially adjustable pressing rod for pressing connection with the double clutch;

a mounting element having a central threaded bushing, the pressing rod of the pressing device comprising a pressing screw adjustably mounted in a central internal thread of the threaded bushing, the threaded bushing having an upper mounting cylinder in an upper axial end area and a lower mounting cylinder in a lower axial end area for a horizontal alignment of the support arms;

a plurality of support arms, each or the support arms having a tie bolt receiving portion for engaging one of the tie bolts, each of the support arms being adjustably mounted at the mounting element, each of the support arms having a pivot axis extending in parallel to a direction of extent of the pressing rod for adjustment of each of the support arms and for adjustment of a position of each of the tie bolts for a concentric alignment of the pressing rod with the transmission shaft;

a bearing plate with a bearing bore mounted on the upper mounting cylinder;

a support plate with a bearing bore mounted on the lower mounting cylinder, the threaded bushing forms, axially between the upper and lower mounting cylinders, a radially expanded bearing flange at which the bearing plate is supported axially on the top side and the support plate is supported axially on the underside, the bearing plate and the support plate being nonrotatably fixed at the bearing flange via at least one spring-type straight pin, the upper bearing plate and lower support plate each forming radially outwardly projecting bearing tongues, the bearing tongues of the bearing plate and the bearing tongues of the support plate being associated with each other in pairs and receive between them in pairs one of the support arms in a pivotingly movable manner;

a plurality of axially adjustable locking pins on the mounting element each meshing with a respective associated support arm for fixing the angular positions of the individual support arms, each of the locking pins having a tie rod, which is provided with an end area located axially opposite a remaining portion of the locking pin, the end area having an external thread, with which an associated tie rod is screwed into an actuating element that nonrotatably engages with a top-side cross slot of the guide element with a locking web in a locked position of locking pin.

* * * * *

UNITED STATES PATENT AND TRADEMARK OFFICE

CERTIFICATE OF CORRECTION

PATENT NO. : 9,073,190 B2
APPLICATION NO. : 13/206748
DATED : July 7, 2015
INVENTOR(S) : Sjösten et al.

It is certified that error appears in the above-identified patent and that said Letters Patent is hereby corrected as shown below:

On The Title Page, item (30) Foreign Application Priority Data should read

-- Aug. 10, 2010 (DE) ........................................20 20100 011341 U --

Signed and Sealed this
Seventeenth Day of November, 2015

Michelle K. Lee
*Director of the United States Patent and Trademark Office*

UNITED STATES PATENT AND TRADEMARK OFFICE

CERTIFICATE OF CORRECTION

PATENT NO. : 9,073,190 B2
APPLICATION NO. : 13/206748
DATED : July 7, 2015
INVENTOR(S) : Sjösten et al.

It is certified that error appears in the above-identified patent and that said Letters Patent is hereby corrected as shown below:

On The Title Page, item (30) Foreign Application Priority Data should read

-- Aug. 11, 2010 (DE) ........................................20 20100 011341 U --

This certificate supersedes the Certificate of Correction issued November 17, 2015.

Signed and Sealed this
Sixteenth Day of February, 2016

Michelle K. Lee
*Director of the United States Patent and Trademark Office*